(12) United States Patent
Byham et al.

(10) Patent No.: US 6,594,231 B1
(45) Date of Patent: Jul. 15, 2003

(54) METHOD AND APPARATUS FOR CONFIGURATION OF STACKABLE UNITS IN PACKET-BASED COMMUNICATIONS SYSTEMS

(75) Inventors: Christopher Byham, Leighton Buzzard (GB); David J Law, Kempston (GB); Nicholas M Stapleton, Uxbridge (GB); Edward Turner, Radlett (GB); Christopher Walker, Watford (GB); David Wright, Bury St Edmunds (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/369,323

(22) Filed: Aug. 6, 1999

(30) Foreign Application Priority Data

May 12, 1999 (GB) ............................................. 9910895

(51) Int. Cl.[7] ............................................. G01R 31/08
(52) U.S. Cl. ........................ 370/223; 370/219; 370/227
(58) Field of Search ................................. 370/216, 217, 370/218, 219, 220, 221, 222, 223, 224, 225, 227, 228, 226, 389, 230

(56) References Cited

U.S. PATENT DOCUMENTS

| 5,003,531 A | * | 3/1991 | Farinholt et al. ...... 340/825.01 |
| 5,781,715 A | * | 7/1998 | Sheu .......................... 370/217 |
| 5,940,367 A | * | 8/1999 | Antonov ..................... 370/218 |
| 6,041,036 A | * | 3/2000 | Baek et al. ................. 370/222 |

FOREIGN PATENT DOCUMENTS

| EP | 0091129 A2 | 10/1983 |
| GB | 2172779 A | 9/1986 |
| GB | 2194713 A | 3/1988 |

* cited by examiner

Primary Examiner—Alpus H. Hsu
Assistant Examiner—Thien Tran
(74) Attorney, Agent, or Firm—Nixon & Vanderhye P.C.

(57) ABSTRACT

A stackable network unit comprises a 'down' port and an 'up' port, an arbitration path for data packets from the down port to the up port, a repeat path for data packets from the up port to the down port, a link detector for detecting tile absence of another operative unit connected to the down port to cause data packets on the return pat to bypass the down port and proceed on the arbitration path and for detecting the absence of another operative unit connected to the up port to cause data packets on the arbitration path to bypass the up port and proceed on the repeat path.

11 Claims, 3 Drawing Sheets

1 = Transmit +
2 = GND
3 = Transmit -
4 = Resilient detect A
5 = Resilient detect B
6 = Receive -
7 = GND
8 = Receive +
Shell = Cable shield

| | | Incoming configuration packet down port status field | | |
|---|---|---|---|---|
| | | Resilient cable | Nothing present | Normal cable |
| Receiving unit down port status | Resilient cable | Lowest MAC address wins | Win | Win |
| | Nothing present | Lose | Lowest MAC address wins | Win |
| | Normal cable | Lose | Lose | Optional (see text) |

METHOD AND APPARATUS FOR CONFIGURATION OF STACKABLE UNITS IN PACKET-BASED COMMUNICATIONS SYSTEMS

FIELD OF THE INVENTION

The present invention relates to stackable units in packet-based communication systems and in particular to 'stackable' hub units which can be 'stacked' or connected so that the units form a single logical entity.

BACKGROUND TO THE INVENTION

When units are stacked to form a single logical device such as a hub or switch, a user connected to a port of any one of the units can send packets to or receive packets from users connected to any of the ports on any of the units, as if all the ports were ports of a single device. In such a system, the units have to be connected to form a closed path or ring by means of which packets can circulate from the unit having the port at which they are received to the unit having the port to which they need to be forwarded.

It is necessary to provide some means of arbitration between requests by the units for access to the ring, that is to say for the ability to place a packet on the ring. This may be achieved in practice, as disclosed in GB patent application number 9812081.9 filed Jun. 5, 1998, and in the corresponding U.S. patent application Ser. No. 09/207655, in the name Brewer et al, filed Dec. 9, 1998, by providing in each of the units a state machine which enables each unit to request access to the ring by forming an arbitration packet resembling an Ethernet packet but containing a header which defines levels of priority, and other status information. Broadly, each of the units is responsive to packet headers circulating with arbitration and priority fields to conduct an arbitration process which enables one and only one of the units to be a master which supplies packets to the ring until it has no more packets to supply, whereupon another unit requesting access to the ring can become the master.

In order to enable units to operate in this manner, the aforementioned patent applications describe a physical structure in which each unit has a two duplex ports, known as the "down" and "up" ports respectively. Each of the units defines two signal paths, one proceeding from the "down" port to the "up" port and the other in the reverse direction. The first of these paths may contain the arbitration process by which in normal operation of the stack the identity of the master unit is established and, for that unit, packets are allowed to enter the ring. The second path is a return path by means of which packets return around the ring. Each unit is so organised that if there is no connection to a particular port, packets or frames on the path to that port will bypass the port and be transmitted back along the other path towards the other port of the same unit. If a port is connected to a port on another hub unit, then a packet arriving at that port will be forwarded to the other hub unit. The units are, or should be, connected so that one, and only one of them is at the 'bottom' of the stack. Such a unit should have no unit connected to its 'down' port. It will preferably be the only unit in an idle master state as a preliminary to the arbitration process which can occur only if at least one unit needs access to the ring for placing packets thereon.

In a practical system up to eight units can be connected together using connection cable and appropriate connectors. A facility which is desirable in such a system is the use of a "resilient" or loop-back cable which enables the ring to be completed even if there is a failure of a single unit within the stack. It is also desirable to enable the "hot" insertion or removal of units, that is to say the insertion or removal of a unit in an operational stack without requiring cessation of the operation of the stack or its powering down.

Since a multiplicity of units can physically be connected in a large selection of different ways, including ways which may be impermissible, it is highly desirable that the units incorporate a configuration process which will automatically select a single unit to be designated as the bottom of the stack.

BRIEF SUMMARY OF THE INVENTION

The main object of the present invention is to provide such a configuration process. Other objects of the invention are to accommodate loop back and improper interconnection.

The invention is based on the use of configuration packets which are sent around the cascade ring. In a preferred form of the invention, these packets contain information indicating that they are not valid data or packet conveying information from one user to another, as well as other status and address information which enables a unit which receives a configuration packet to perform a comparison between status information in the configuration packet and status information of the unit. If a unit 'loses' the comparison process, it will forward any subsequent configuration packets, If the unit 'wins' the comparison it may source its own configuration packets. The information contained in the packets and the processing of the packets is selected so that the configuration process ends with a single one of the units deemed to be the bottom of the stack. The process is preferably conducted such that the stack performs a numbering programme which enables the detection of "illegal" stacks, that is to say stacks which are improperly connected using, for example, more than one loop back cable (hereinafter called 'resilient cable').

The features which form the basis of the invention and constitute preferred options within it will be further explained in the following, with reference to the accompanying drawings.

DETAILED DESCRIPTION OF THE PREFERRED EMBODIMENT

Figure 1:
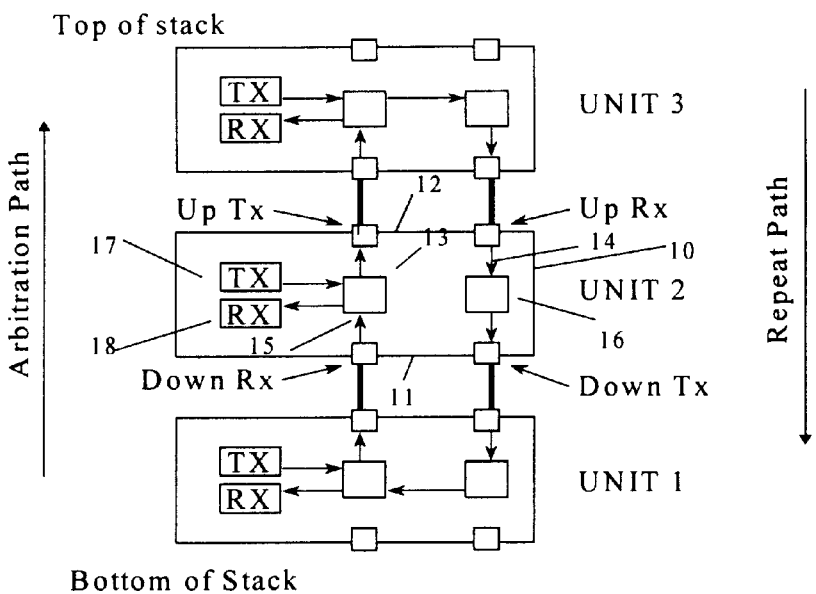
FIG. 1 illustrates a cascade or ring of hub units.

FIG. 1 illustrates schematically three stacked hub units, designated 'unit 1', 'unit 2', and 'unit 3', connected together to form a ring for the circulation of packets that may be put on the ring by any one of the units. It will be understood that only one unit at any time may in normal operation place packets on the ring. Each of the units is similar and for convenience only the middle unit will be described in detail. This unit is a hub unit 10 which has two duplex ports, a first port 11, conveniently called 'down' port and a second port 12, conveniently called 'up' port. The unit 10 has two signal paths. A first path, which for various reasons is preferably termed the arbitration path, proceeds from the 'down' port 11 of the unit to the 'up' port 12. It is convenient to sub-divide the functions of the ports into receive and transmit (Rx and Tx respectively). Thus the arbitration path proceeds from the down Rx terminal to the up Tx terminal. A second or return path 14 extends from the port 12 to the port 11, and in particular from the 'up Rx' part of the second port 12 to the 'down Tx' part of port 11.

The forward or arbitration path 13 includes a processing section 15 which in the normal operation of the hub unit cooperates with arbitration packets that are sent around the ring and which, as briefly described later, and more fully described in the aforementioned applications, enable the units to determine which will be the master unit (placing packets on the ring) at any time in a manner which grants the units a fair access to the ring. In FIG. 1, the processing function 15 is shown as connected to a transmit (TX) section 17 and a receive (RX) section 18. These are intended to represent the transmitting and receiving functions respectively of the hub unit, which in respect of its connection to ports (not shown) is intended to be of known form. A single hub can broadcast a packet received at any port to all its other ports and the purpose of stacking units is to provide a hub unit with many more ports than can conveniently be provided on a single commercially acceptable unit.

Figure 2:
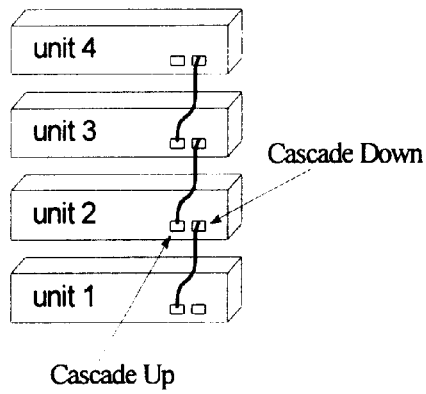
FIG. 2 illustrates diagrammatically a stack of connected hub units.

FIG. 2 illustrates a simple way of connecting a cascade of units so that they form a mutual ring as indicated in FIG. 1. In the simple connection shown in FIG. 2, the 'up' port of the lower of each adjacent pair of units is connected by a known form of cable to the 'down' port of the next unit up. FIG. 2 illustrates four stacked units arranged in this manner.

Figures 3, 7:
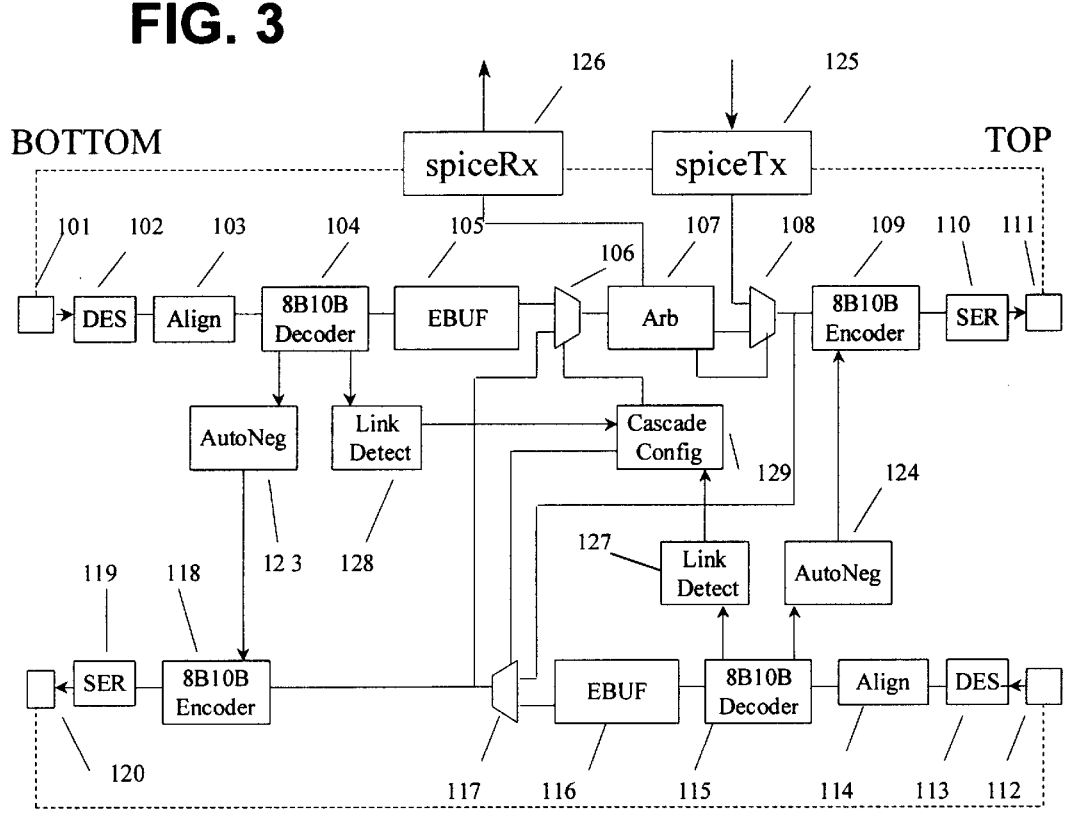
FIG. 3 illustrates part of a hub unit in greater detail.
FIG. 7 illustrates a process of comparison between status fields of a configuration packet and the status of a unit.

Before leaving FIG. 2, and by way of introduction to FIG. 3, it may be remarked that each unit is adapted to sense whether a given port is connected to another operative unit. This may be performed in known manner, by the process set out in IEEE standard 802.3-1998, clause 37, but briefly, the effect is that if a port is not connected to another operative unit, the unit causes that port to be internally bypassed by packets which would otherwise proceed towards that port. Thus as shown for unit 1, for which the 'down' port is not connected to another unit, packets that would proceed along the return or repeat path towards the down port internally bypassed that port and proceed to the first or arbitration path. Likewise, as shown for unit 3, of which the 'up' port is not connected to another unit, packets that proceed towards the 'up' port along the arbitration path internally bypassed that port to the return path. In this manner, as also explained in the aforementioned patent applications, the units define a cascade within which is provided a ring for the circulation of packets, enabling both arbitration for access to the ring and also enabling packets to pass from one unit to the others.

In the example shown in FIG. 1, unit 1 is at the 'bottom' of the stack As will be further explained hereinafter, owing to the possibility of the use of 'resilient' cable or incorrect combinations of cables, it cannot be presumed that unit 1 will be at the bottom of the stack and it is desirable to provide a configuration process by means of which the unit that effectively is at the bottom of the stack is determined.

FIG. 3 illustrates the general layout of a unit. This is generally in the form described in the earlier applications and accordingly need only be described in a summary form Signals received at the down RX terminal 101 are de-serialised block 102, aligned in block 103, decoded in an 8B10B decoder 104, stored temporarily in elastic buffer 105, and coupled to one input of multiplexer 106. The output of multiplexer 106 is coupled to an arbitration unit 107 (generally described in the aforementioned applications) and the arbitrator path includes a multiplexer 108, an 8B 10B encoder 109, and serialiser 110 coupled to the up transmit terminal 111.

The down path commences with the up receive terminal 112 and proceeds through a deserialiser 113, an alignment block 114, an 8B10B decoder 115, an elastic buffer 116, a multiplexer 117, an 8B10B encoder 118, and a serialiser 119 to the down transmit terminal 120.

A conventional auto-negotiation circuit 123 is coupled to the decoder 104 and the encoder 118 and a corresponding auto-negotiation circuit 124 is connected to the decoder 115 and the encoder 109.

Among other things, the purpose of the multiplexers 106 and 117 is to provide a bypass of the down port (101/120) and one purpose of the multiplexer 108 and the multiplexer 117 is to provide bypass of the up port (111/112). Multiplexer 108 also serves, under the control of the arbitration unit 107, to provide packets onto the ring if the unit is acting as a master, as described in the aforementioned applications. Packets from ports (not shown) arrive by way of a bus 125. Packets can leave the ring at arbitration unit 107, if the respective unit is the 'master', and travel by way of bus 126 to those ports. At all other units in the ring, the arbitration unit copies the packet to the encoder 109 via the multiplexer 108 and, if the relevant destination box id is set, also copies the packet to the bus 126.

A link detection function 128 coupled to decoder 104 is generally configured as a RX sync function in accordance with the IEEE standard 802.3-1998 Clause 37, but may include an error rate threshold counter with a threshold which, if exceeded, is used as a criteria for a link fail. Thus if the down port (101/120) is not receiving signals, either the unit is at the bottom of the stack or a stack failure has occurred. There is also a link detect function 127 which is coupled to decoder 115 The link detect functions 127 and 128 can determine by way of the cascade configuration function 129, operate multiplexers 106, 108 and 117, depending on circumstances, so that if there is no unit connected to the down port, packets or headers arriving at multiplexer 117 will be routed by way of multiplexer 106 back to the up path. Likewise, if there is no unit connected to the up port, packets or headers passing through arbitration unit 107 and arriving at multiplexer 108 will be routed by way of multiplexer 117, thereby bypassing the up port.

Thus when a cascade port is connected to another port it will first use (in this example) the RX sync function to establish if a valid connection exists. If so, it will auto-negotiate to establish the capabilities of the connected device and, if the device is capable of being connected in the cascade, this will be indicated to the link detect block and the multiplexers will be set such that the port is connected into the cascade ring.

Figure 8:
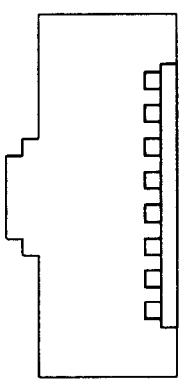
FIG. 8 illustrates a terminal connector.

FIG. 8 illustrates a standard form of connector, an eight pin shielded ANSI fibre channel style-2 connector which may have a mechanical mating interface as defined by IEC 61076-3-103. In essence pins 1 and 3 of this connector constitute the transmit path and pins 6 and 8 constitute the receive path, pins 1 and 8 being positive and pins 3 and 6 being negative. Connection of pins 4 and 5 denotes a 'resilient' cable. The connection may be sensed internally by means of a pull-up resistor connected to pin 4 and a ground connection to pin 5, so that pin 4 will go 'low' for a resilient cable.

Figure 4:
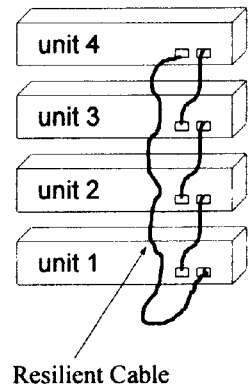
FIG. 4 illustrates a stack of units and a resilient cable.

In the simply connected system shown in FIG. 2, it is easy to identify which unit is at the 'bottom' of the stack. However, it is not necessary to make such a simple connection wherein each unit has its 'up' port connected to the 'down' port of the unit which is physically next to it in the ascending direction. Furthermore, it is customary and desirable to employ a loop back cable such as is shown in FIG. 4 wherein unit 4 in that Figure has its 'up' port connected to the 'down' port of unit 1. The advantage of using a resilient cable is that it enables a maximum of units to continue functioning in the event that one of the units is subject to failure.

The configuration phase has several sub phases. First, it needs to detect valid code words and auto-negotiation to determine that a connection with valid coding exists on its cascade up or cascade down ports and that the connected unit is either operating as a cascade unit or is capable of so doing. Second, having verified that a valid connection exists, the unit must connect to that unit by setting the data path multiplexers appropriately so that the up or down port (or both of them as the case may be) is no longer bypassed. Third, it needs to send configuration frames (which may be generated in the arbitration unit 107) in order to resolve the bottom of the stack condition and unit numbering.

Once the 'bottom of stack' has been resolved, a unit needs to enter the idle master arbitration state if the unit is at the bottom of the stack or the idle state if it is not.

Configuration may need to be performed when power is turned on or reset. Further, link status changes can occur when units power up or down or cables are removed. The insertion or removal of a cable may cause several status changes because in practice a resilient cable detection circuit is separate from the data circuit. Further, a system may enter the configuration state if a unit fails to detect an arbitration header within a set length of time, typically set to be twice the maximum length of the packets plus some arbitrary margin. Furthermore, whenever a packet passes the 'bottom of stack' unit, that unit sets a bit (illustrated as the 'boss' bit) to indicate its presence. This provides two detectable error conditions. First, if the master is stripping its own packet off, the bit is not set then a ring master error has occurred. Second, if the bottom of stack unit receives a packet with the boss bit set and no parity error, there is a boss error either because there are no masters on the ring or there is a second unit that is acting as if it were the bottom of the stack.

Figure 5:
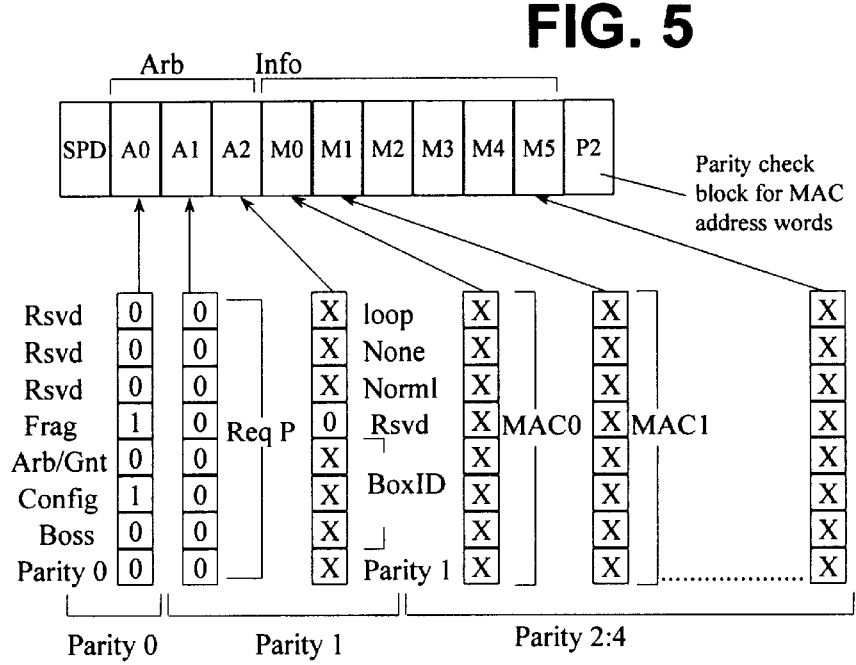
FIG. 5 illustrates a header for one type of a configuration packet.

The general principle is that if any of the above circumstances are detected, then a unit may send out a configuration packet. These packets are sent out without arbitrating for access to the ring. Such a packet is shown in FIG. 5. FIG. 5 illustrates a configuration packet as put on the ring. It has an Arb/Gnt field set to '0' to indicate that it is not an arbitration packet and a 'config' field set to '1' to indicate that it is a configuration packet. The 'boss' field is '0' because the bottom of the stack has not yet been restored. The packet will have its 'loop', 'none' and 'normal' bits set as indicated below and its BoxID field set as explained below.

Figure 6:
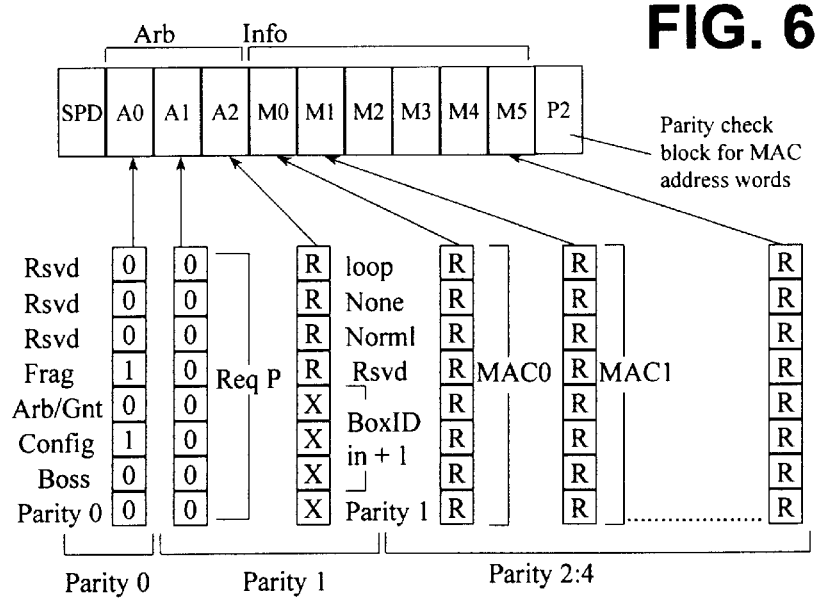
FIG. 6 illustrates a header for another type of configuration packet.

FIG. 6 illustrates a configuration packet which is provided by a unit in a repeat mode. The symbol R means that the values possessed by a packet as received are merely repeated. The only change is the incrementing of the BoxID field by unity.

A packet such as shown in FIG. 5 indicate the down port status of its source unit and will be compared with the down port status of a unit that receives it, according to the table shown in FIG. 7.

In the configuration packets and FIG. 7, 'Nothing present' means that there is no other unit connected to the relevant down port that is to say nothing being received is indicated by the link configuration for that port. This would normally indicate that the unit is at the bottom of the stack but it could occur (as indicated above) if a unit in the middle of the stack failed, leaving the unit above it seeing 'nothing present'.

'Resilient cable' means that the down port has a resilient cable present, as indicated by a status signal specific to this type of cable on one of its connector pins. This parameter is asserted regardless of whether anything is being received on the down port.

'Normal cable' means that there is a unit connected to the down port of the unit, and valid activity is being received from it, as indicated by the link configuration.

These three parameters in the source unit are indicated by the 'none', 'loop' and 'normal' fields and are used to determine if a unit is at the bottom of the stack by the following reasoning:

(a) If there is no resilient cable being used within a stack and all the units are working correctly, only the 'bottom' unit will see 'nothing present'. All the other units will see 'normal' cable at their down ports. Clearly therefore the bottom unit is at the bottom of the stack. If a resilient cable is being used in the stack it must be connected between the bottom of the stack unit and the top of the stack unit (units 1 and 4 in FIG. 4). Since there is now no unit present in the stack with nothing present, the only way of distinguishing the bottom of the stack unit is by way of the presence of the resilient cable on the down port. If while a resilient cable is being used one of the units in the stack fails, then the unit above it will see nothing present. In this case the unit with the resilient cable connected to its down port is still the 'bottom of stack'.

However, there are other circumstances which can be accommodated by the resolution scheme shown in the table. If a customer chooses to use several resilient cables within a stack or if he chooses to try and use a normal cable as a resilient cable, it is desirable to ensure that the stack still works even though the stack numbering may not be conventional and to resolve a single unit to perform the bottom of stack functions.

The table summarises the decision each receiving unit must make based on the cable status of its own cascade down port versus that indicated by the configuration packet. If the result is 'win' the unit enters the configuration master mode and must continue as a source for configuration packets until it sees its own packet returned, as indicated by unique MAC address for each unit.

If the result is 'lose', the unit must enter a configuration repeat mode wherein it repeats the incoming configuration packets, but modifies them so as to increment the unit number in the status box location as shown by the packet in FIG. 6. The configuration master mode will provide such a packet with this value set to zero. The resulting number is stored and will become the stack unit of that number, that is to say the physical location of the stack, once the 'bottom of stack' is resolved.

If the result is 'lowest address wins', there is a misconfiguration in the stack and the unique MAC address value is used to resolve the decision.

The option shown in FIG. 7 is either 'Lose' or 'Lowest MAC address wins'. The former will prevent a loop being made with normal cables because the configuration process would continue indefinitely but the latter will allow a loop to be made with normal cables instead of a resilient cable.

The result of this process is that one and only one unit will remain as the configuration master, sourcing configuration packets onto the ring while all the other units merely repeat the packet and store the result of the incremented status box value as there are source unit numbers. The single remaining configuration master will thus be 'bottom of the stack' and all the other units will be numbered in ascending order above it.

In the case of a mis-configuration the units will still be numbered in ascending order from the configuration master which will assume the 'bottom of stack' function, but its location may be anywhere within the stack.

What is claimed is:

1. A stackable network unit including a first port and a second port, a first path for data packets from said first port to said second port, a second path for data packets from sad second port to said first port, a detector for detecting the absence of another operative unit connected to said first port to cause data packets on said second path to bypass said first port and proceed on said first path and for detecting the absence of another operative unit connected to said second port to cause data packets on said first path to bypass said second port and proceed on said second path, whereby the unit can form a ring communication system with other units, the stackable unit including configuring means which can cooperate by means of coded configuration packets with said other Units to establish a numerical ordering of the units in the ring, each such packet including fields which indicate the coded configuration nature of the packet, the status of the first port of the unit which was the source of the packet, a unit number and a device address; the unit being operative on receipt of such a packet from another unit by way of its said first port to compare the status information in the packet with the status of its own first port and depending on that comparison to generate a packet which has that unit's status and address information and a datum number or to forward the packet as received with incrementing of its unit number, the unit being further operative to determine whether it has received its own configuration packet by a comparison of the device address in the packet with its own address.

2. A unit according to claim 1 wherein said first path includes means for coupling data buses to said path for enabling data packets to be put on said ring and to be taken from said ring.

3. A unit according to claim 2 wherein a configuration packet denotes said status by fields which respectively indicate no connection, a normal connection and a loop-back connection.

4. A stackable network unit including:
   a first port having a receiving part and a transmitting part;
   a second port having a transmitting part and a receiving function part;
   a first data path within the unit from said receiving part of said first port to the transmitting part of said second port;
   a second data path within said unit from said receiving part of said second port to said transmitting part of said first port;
   a detector for detecting the absence of another operative unit connected to said first port to cause data packets on said second data path to bypass said first port and be looped-back within said unit to proceed on said first path;
   a detector for detecting the absence of another operative unit connected to said second port to cause data packets proceeding on said first data path to bypass second port and to be looped-back within said unit to proceed on said second path; whereby the unit can constitute an end unit in a stack of units coupled by a ring including said first and second paths;
wherein the stackable network unit includes configuring means for establishing a numerical ordering of the units in said ring, said configuring means:
   (a) being responsive to a coded configuration packet which includes fields for indicating the coded configuration nature of the packet, port connection status data relating to a first port of a unit which was the source of the packet and a unit number;
   (b) being operative to compare said port connection status data in said packet with the port connection status of the stackable network unit's own first port and dependent on that comparison to generate a configuration packet which defines said status and a datum number or to forward said coded configuration packet as received with an increment of said unit number.

5. A stackable network unit as set forth in claim 4, wherein said coded configuration packet includes a field for indicating a device address, and wherein said stackable network unit is operative to determine whether it has received its own configuration packet by a comparison of the device address in said coded configuration packet with an address owned by the stackable network unit.

6. A stackable network unit as set forth in claim 4, and including a coupler for coupling data buses to said first data path for enabling data packets to be put on said ring and to be taken from said ring.

7. A stackable network unit as set forth in claim 4, wherein said coded configuration packet denotes said port connection status data by fields which respectively indicate no connection, a normal connection and a loop-back connection.

8. A method comprising:
   establishing a first data path within a stackable network unit from a receiving part of a first port to a transmitting part of a second port;
   establishing a second data path within the stackable network unit from a receiving part of the second port to a transmitting part of the first port;
   detecting an absence of another unit connected to the first port to cause data packets on the second data path to bypass the first port and be looped-back within the stackable network unit to proceed on the first path;
   detecting an absence of another unit connected to the second port to cause data packets proceeding on the first data path to bypass the second port and to be looped back within the stackable network unit to proceed on the second path, whereby the unit constitutes a unit in a stack of units coupled by a ring including the first and second paths; and
   establishing a numerical ordering of the units in the ring, by
   (a) responding to a coded configuration packet which includes fields for indicating the coded configuration nature of the packet, port connection status data relating to a first port of a unit which was the source of the packet and a unit number; and
   (b) comparing said port connection staffs data in said packet with the port connection status of the stackable network unit's own first port, and dependent on that comparison generating a configuration packet which defines said status and a datum number or forwarding said coded configuration packet as received with an increment of said unit number.

9. A method of claim 8, wherein said coded configuration packet includes a field for indicating a device address, and wherein said stackable network unit determines whether it has received its own configuration packet by a comparison of the device address in the coded configuration packet with an address owned by the stackable network unit.

10. A method of claim 8, further comprising coupling data buses to the first data path for enabling data packets to be put on the ring and to be taken from the ring.

11. A method of claim 8, wherein the coded configuration packet denotes said port connection status data by fields which respectively indicate no connection, a normal connection and a loop-back connection.

* * * * *